United States Patent
Kimmel et al.

(10) Patent No.: US 11,609,047 B2
(45) Date of Patent: Mar. 21, 2023

(54) HIGH PRESSURE CAPABLE LIQUID TO REFRIGERANT HEAT EXCHANGER

(71) Applicant: Modine Manufacturing Company, Racine, WI (US)

(72) Inventors: Adam Kimmel, Franksville, WI (US); David Hartke, Gurnee, IL (US); Gregory Mross, Mount Pleasant, WI (US); Daniela Welchner, Zell unter Aichelberg (DE); Michael Steffen, Birkenfeld (DE)

(73) Assignee: MODINE MANUFACTURING COMPANY, Racine, WI (US)

( * ) Notice: Subject to any disclaimer, the term of this patent is extended or adjusted under 35 U.S.C. 154(b) by 428 days.

(21) Appl. No.: 16/582,664

(22) Filed: Sep. 25, 2019

(65) Prior Publication Data
US 2020/0018552 A1 Jan. 16, 2020

Related U.S. Application Data (63) Continuation-in-part of application No. PCT/US2019/023310, filed on Mar. 21, 2019.
(Continued)

(51) Int. Cl.
*F28D 1/047* (2006.01)
*F28F 1/04* (2006.01)
(Continued)

(52) U.S. Cl.
CPC ......... *F28D 1/0478* (2013.01); *F28D 7/1615* (2013.01); *F28F 1/04* (2013.01);
(Continued)

(58) Field of Classification Search
CPC .. F28D 1/0478; F28D 2001/026; F28D 7/087; F28D 7/1615; F28F 1/02;
(Continued)

(56) References Cited

U.S. PATENT DOCUMENTS

| 2,646,258 A | 7/1953 | Freer |
| 2,919,903 A | 1/1960 | Vautrain et al. |

(Continued)

FOREIGN PATENT DOCUMENTS

| CN | 107 314 390 A | 11/2017 |
| EP | 2402694 A1 | 1/2012 |

(Continued)

OTHER PUBLICATIONS

Notice of Allowance issued from the US Patent Office for related U.S. Appl. No. 17/040,930 dated Oct. 6, 2021 (8 Pages).
(Continued)

*Primary Examiner* — Len Tran
*Assistant Examiner* — Gustavo A Hincapie Serna
(74) *Attorney, Agent, or Firm* — Michael Best & Friedrich LLP (57) ABSTRACT

A liquid to refrigerant heat exchanger includes an enclosed coolant volume that is at least partially defined by a plastic housing and by a metal closure plate. The metal closure plate can be part of a brazed assembly containing a continuous refrigerant flow path. The refrigerant flow path is disposed within the coolant volume, where heat can be transferred between the refrigerant within the refrigerant flow path and the liquid within the coolant volume. The plastic housing can at least partially surround the refrigerant flow path to at least partially bound a liquid flow path along a portion of the coolant volume. An inlet diffuser and an outlet diffuser can be mounted to the housing to direct the liquid through the housing. The plastic housing is sealingly joined to the closure plate along an outer periphery of the closure plate.

19 Claims, 10 Drawing Sheets

Related U.S. Application Data (60) Provisional application No. 62/647,053, filed on Mar. 23, 2018.

(51) Int. Cl.
*F28F 9/00* (2006.01)
*F28F 9/02* (2006.01)
*F28D 7/16* (2006.01)
*F28D 1/02* (2006.01)
*F28F 1/12* (2006.01)

(52) U.S. Cl.
CPC .............. *F28F 9/001* (2013.01); *F28F 9/005* (2013.01); *F28F 9/0243* (2013.01); *F28D 2001/026* (2013.01); *F28F 1/126* (2013.01); *F28F 2009/029* (2013.01); *F28F 2230/00* (2013.01); *F28F 2275/04* (2013.01)

(58) Field of Classification Search
CPC .... F28F 1/04; F28F 1/126; F28F 9/001; F28F 9/005; F28F 9/0226; F28F 9/0243; F28F 2009/029; F28F 21/06; F28F 21/08; F28F 2230/00; F28F 2275/04; B60H 1/2221; B60H 2001/00949
USPC .......................................................... 165/157
See application file for complete search history.

(56) References Cited

U.S. PATENT DOCUMENTS

| | | | |
|---|---|---|---|
| 4,700,774 A | 10/1987 | Schwarz | |
| 5,875,837 A | 3/1999 | Hughes | |
| 5,944,089 A | 8/1999 | Roland | |
| 6,892,803 B2 | 5/2005 | Memory et al. | |
| 7,337,769 B2* | 3/2008 | Yi | F28D 7/0016 |
| | | | 123/563 |
| 8,011,422 B2 | 9/2011 | Yamazaki et al. | |
| 9,163,716 B2 | 10/2015 | Chudy et al. | |
| 9,506,701 B2 | 11/2016 | Khelifa et al. | |
| 10,323,886 B2* | 6/2019 | Da Silva | F28D 9/0043 |
| 10,337,801 B2* | 7/2019 | Meshenky | F28F 9/08 |
| 10,443,948 B2* | 10/2019 | Seo | F28D 9/0081 |
| 2004/0194934 A1 | 10/2004 | Hofbauer | |
| 2006/0288727 A1 | 12/2006 | Aikawa et al. | |
| 2008/0202724 A1* | 8/2008 | Lorenz | F28D 7/0091 |
| | | | 165/51 |
| 2008/0223562 A1* | 9/2008 | Braic | F28F 9/0224 |
| | | | 165/158 |
| 2008/0289804 A1 | 11/2008 | Baumann et al. | |
| 2009/0056922 A1* | 3/2009 | Hemminger | F02M 26/32 |
| | | | 165/158 |
| 2009/0277606 A1 | 11/2009 | Reiss, III et al. | |
| 2010/0206534 A1* | 8/2010 | Amaya | F28D 7/1692 |
| | | | 165/173 |
| 2012/0061053 A1 | 3/2012 | Geskes et al. | |
| 2013/0213621 A1* | 8/2013 | Pierre | F28D 9/0043 |
| | | | 165/166 |
| 2014/0000841 A1* | 1/2014 | Baker | F28F 17/005 |
| | | | 165/59 |
| 2014/0027099 A1* | 1/2014 | Sispera | F02M 26/32 |
| | | | 165/177 |
| 2014/0130764 A1 | 5/2014 | Saumweber et al. | |
| 2014/0352302 A1 | 12/2014 | Cho et al. | |
| 2015/0107807 A1 | 4/2015 | Hund et al. | |
| 2015/0107810 A1* | 4/2015 | Drankow | F28F 9/0226 |
| | | | 29/890.038 |
| 2015/0176922 A1 | 6/2015 | Day | |
| 2015/0292804 A1* | 10/2015 | Hermida Dominguez | F28F 21/084 |
| | | | 165/167 |
| 2015/0316330 A1* | 11/2015 | Kenney | F28D 9/0056 |
| | | | 165/167 |
| 2015/0338169 A1* | 11/2015 | Okami | F28F 13/08 |
| | | | 165/157 |
| 2015/0345877 A1 | 12/2015 | Mori et al. | |
| 2016/0097596 A1* | 4/2016 | Stewart | F28F 1/045 |
| | | | 165/175 |
| 2016/0370131 A1* | 12/2016 | Hermida Domínguez | F28F 1/34 |
| 2017/0146303 A1* | 5/2017 | Mayo | F28F 9/0075 |
| 2018/0292147 A1* | 10/2018 | Heine | F02B 29/0462 |
| 2018/0306520 A1* | 10/2018 | Kolder | F02B 29/04 |
| 2019/0120562 A1* | 4/2019 | Fuller | F28F 1/40 |
| 2019/0162489 A1* | 5/2019 | Fabian | F28F 1/40 |
| 2019/0284973 A1* | 9/2019 | Kim | F01M 5/001 |
| 2019/0285365 A1* | 9/2019 | Streeter | F28D 9/0093 |

FOREIGN PATENT DOCUMENTS

| | | |
|---|---|---|
| KR | 101520339 B1 | 5/2015 |
| WO | 2017030381 A1 | 2/2017 |
| WO | 2017/097133 A1 | 6/2017 |
| WO | 2018/024185 A1 | 2/2018 |

OTHER PUBLICATIONS

Supplementary Examination Report issued from the European Patent Office for related Application No. 19772042.8 dated Jan. 25, 2022 (8 Pages).

* cited by examiner

FIG. 15

HIGH PRESSURE CAPABLE LIQUID TO REFRIGERANT HEAT EXCHANGER

CROSS-REFERENCE TO RELATED APPLICATIONS

This application is a continuation-in-part of International Patent Application No. PCT/US19/23310 filed on Mar. 21, 2019, which claims priority to U.S. Provisional Patent Application No. 62/647,053 filed on Mar. 23, 2018, the entire contents of which are hereby incorporated by reference herein.

BACKGROUND

Chiller systems are commonly used in a variety of applications to produce a cooled supply of a liquid coolant at a temperature that is lower than can be achieved by direct ambient air cooling. In a conventional chiller system, a vapor compression refrigerant system is typically employed to produce a flow of at least partially liquid refrigerant at a low temperature and to supply that refrigerant in that state to a liquid to refrigerant heat exchanger in order to transfer heat from a flow of the liquid coolant to the refrigerant, thereby evaporating the refrigerant and chilling the liquid coolant to a suitably low temperature. The evaporated refrigerant is subsequently compressed to an elevated pressure, at which condition the absorbed heat can be rejected to, for example, ambient air in order to re-condense the refrigerant.

Such chiller systems are oftentimes applied for producing large flows of chilled coolant, such as for building cooling and the like, and are consequently large in scale. As a result, the liquid to refrigerant heat exchangers used to transfer the heat between the coolant and the evaporating refrigerant are likewise of a relatively large scale. More recently, the advent of electrified vehicles have created a need for substantially smaller, lighter, and more compact chiller systems to produce chilled coolant for the cooling of batteries, inverters, motors, and other power electronics associated with the use of electric vehicles. The liquid to refrigerant heat exchangers that are typically used in chiller systems have proven to be particularly unsuitable for such applications, being neither compact nor light in weight.

The problem is further exacerbated in vehicle chiller systems that use a high-pressure refrigerant such as carbon dioxide. Such systems are seen as particularly advantageous in that carbon dioxide is neither flammable nor toxic, is naturally occurring, inexpensive, widely available, and has a net global warming impact of zero. Furthermore, carbon dioxide performs particularly well as a heat pumping fluid, wherein the refrigerant cycle is reversed to that the liquid to refrigerant heat exchanger is used to transfer heat from the compressed refrigerant to the liquid coolant in order to heat the liquid coolant. Such operation is particularly advantageous in electric vehicle applications, wherein the waste heat produced by the vehicle drivetrain is insufficient to provide proper cabin heating in cold weather operation.

The use of natural refrigerants such as carbon dioxide can be difficult, however, due to their operation at relatively high pressures. Such high system pressures requires that the equipment of the chiller system—including the heat exchangers—be capable of withstanding the structural loads imposed by the operating pressure while still affording the advantages of compact and light weight construction. An example of a liquid to refrigerant heat exchanger for use with carbon dioxide refrigerant that is capable of withstanding the elevated pressures of carbon dioxide refrigerant system operation can be found in U.S. Pat. No. 6,892,803 to Memory et al. The housingless liquid to refrigerant heat exchanger of Memory et al. uses high pressure capable refrigerant tubes interleaved with coolant tubes.

SUMMARY

According to embodiments of the invention, a liquid to refrigerant heat exchanger provides a refrigerant flow path through the heat exchanger that is capable of withstanding elevated refrigerant pressures. A coolant flow path through the heat exchanger is at least partially bounded by a plastic housing.

Within this written description, the liquid that is exchanging heat with the refrigerant within the heat exchanger will generically be referred to as a "coolant". It should be understood that, while the exemplary embodiment of the invention described herein is particularly well-suited for use with traditional automotive coolants such as water, ethylene glycol, propylene glycol, etc., or mixtures of the same, the invention is not limited to the use of such liquids. Other liquids capable of being heated and/or cooled by a flow of refrigerant can be equally suitable for use in the exemplary embodiment or in other embodiments, and the invention is not intended to be limited to use with any particular types of liquids.

A liquid to refrigerant heat exchanger according to the invention can be especially well-suited for use in a chiller system using a natural refrigerant such as carbon dioxide. The heat exchanger can be used in such a system to transfer heat from a liquid coolant to a flow of refrigerant, or from a flow of refrigerant to a liquid coolant. In some such systems the system can be reversible, so that under some operating conditions the direction of heat transfer is from the refrigerant to the coolant and under other operating conditions the direction of heat transfer is from the coolant to the refrigerant.

In at least one embodiment, the liquid to refrigerant heat exchanger includes a coolant volume that is at least partially defined by a plastic housing and by a metal closure plate. The plastic housing is sealingly joined to the closure plate along an outer periphery of the closure plate. In at least some embodiments, the seal is created by a peripheral crimp joint.

In some embodiments, the liquid to refrigerant heat exchanger further includes a cylindrical inlet manifold and a cylindrical outlet manifold arranged within the coolant volume, along with refrigerant conduits that are arranged within the coolant volume and that extend from the cylindrical inlet manifold and the cylindrical outlet manifold to convey a flow of refrigerant from the inlet manifold to the outlet manifold. An inlet fitting block and an outlet fitting block are each joined to, and extend through, the metal closure plate. A portion of each of the fitting blocks is located within the coolant volume, and another portion of each of the fitting blocks is arranged outside of the coolant volume. In at least some such embodiments, the inlet fitting block and the outlet fitting block each extend through flanged apertures in the closure plate.

In at least some such embodiments, the inlet manifold is joined to the portion of the inlet fitting block that is located within the coolant volume, and the outlet manifold is joined to the portion of the outlet fitting block that is located within the coolant volume. In at least some embodiments the outlet manifold is also joined to that portion of the inlet fitting block, and the inlet manifold is also joined to the that portion of the outlet fitting block.

A refrigerant inlet port is arranged on that portion of the inlet fitting block that is located outside of the coolant volume, and a refrigerant outlet port is arranged on that portion of the outlet fitting block that is located outside of the coolant volume. The refrigerant inlet port is in fluid communication with an internal volume of the inlet manifold by way of a flow path extending through the inlet fitting block, and the refrigerant outlet port is in fluid communication with an internal volume of the outlet manifold by way of a flow path extending through the outlet fitting block.

In at least some embodiments, the closure plate, the inlet fitting block, the outlet fitting block, the inlet manifold, the outlet manifold, and the refrigerant conduits are all joined together by braze joints in order to define a leak-free refrigerant flow path between the refrigerant inlet port and the refrigerant outlet port.

In at least some embodiments, each of the refrigerant conduits includes several sequentially arranged passes through the coolant volume. In some such embodiments, coolant fins are arranged between and joined to adjacent and/or successive passes of the refrigerant conduits. In some embodiments, the coolant fins are brazed to the refrigerant conduits in the same brazing operation that joins the refrigerant conduits to the inlet and outlet manifolds.

In some embodiments, the coolant volume of the liquid to refrigerant heat exchanger is divided into a coolant inlet portion located at one of the heat exchanger, a coolant outlet portion arranged at another end of the heat exchanger opposite that one end, and a heat exchange portion arranged between the coolant inlet portion and the coolant outlet portion. In at least some embodiments the refrigerant conduits are arranged within the heat exchange portion of the coolant volume.

In some such embodiments, the heat exchanger includes a first coolant baffle arranged between the coolant inlet portion and the heat exchange portion, and a second coolant baffle arranged between the coolant outlet portion and the heat exchange portion. In some such embodiments, the first and the second coolant baffles each have an aperture that corresponds to an outer periphery of coolant fins that are joined to the refrigerant conduits. In some embodiments the first and the second coolant baffles are received within recessed grooves provided in the plastic housing.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

A liquid to refrigerant heat exchanger 1 that is particularly well-suited to the use of a high-pressure refrigerant is depicted in FIGS. 1-5. Such a heat exchanger can find particular utility in, for example, automotive applications requiring a supply of chilled liquid coolant. Such applications can be particularly useful in electric vehicles, wherein the flow of chilled coolant is used to remove heat from batteries and/or power electronics that are used to provide propulsion to the vehicle. In other applications, such a liquid to refrigerant heat exchanger 1 can be used to provide chilled coolant for other purposes, such as passenger cooling. In still other applications the liquid to refrigerant heat exchanger 1 can be used to reject heat from the refrigerant to a flow of cooling liquid, such as in a heat pump application.

As depicted in the accompanying figures, the liquid to refrigerant heat exchanger 1 includes a plastic housing 3 that is sealingly joined to a metal closure plate 4. The metal closure plate 4 is preferably part of a brazed assembly 2, depicted in FIG. 3. The plastic housing 3 and the metal closure plate 4 together cooperate to define a coolant volume 20 within the liquid to refrigerant heat exchanger 1.

Figure 1:
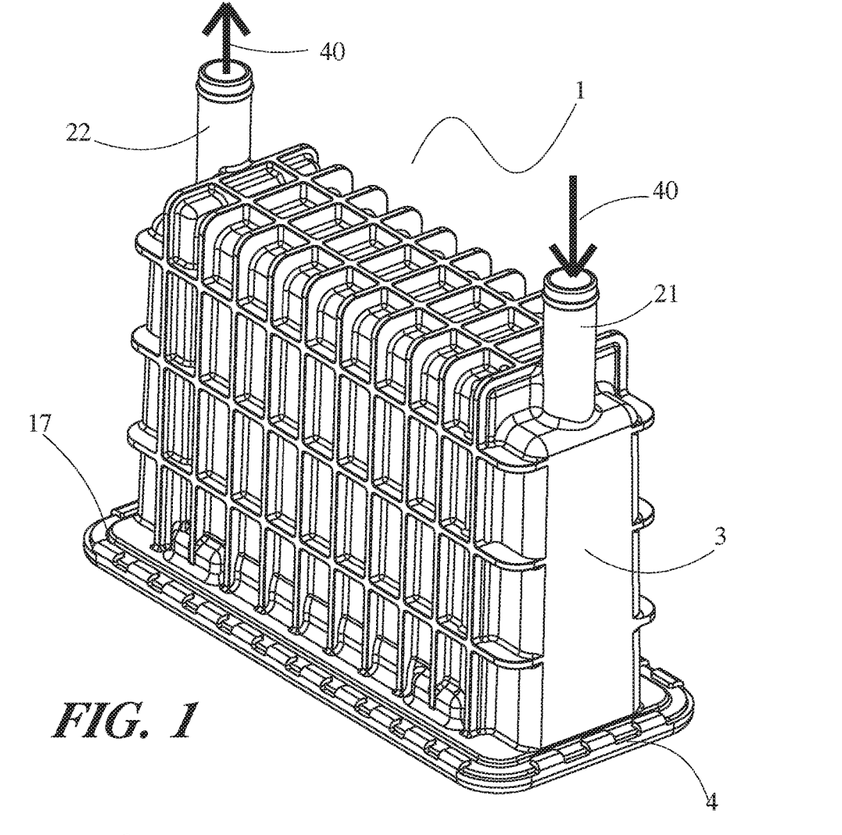
FIG. 1 is a perspective view of a liquid to refrigerant heat exchanger according to an embodiment of the invention.
Figure 2:
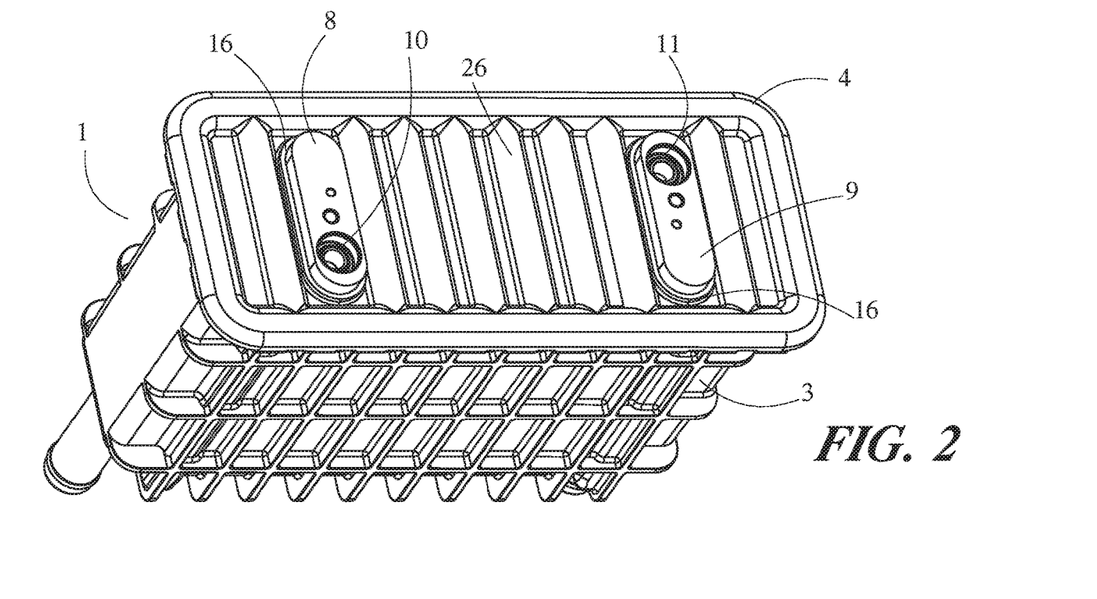
FIG. 2 is another perspective view of the liquid to refrigerant heat exchanger of FIG. 1.

As best seen in FIG. 1, the plastic housing 3 includes a coolant inlet port 21 arranged at one end of the plastic housing 3 and a coolant outlet port 22 arranged at an opposite end of the plastic housing 3. This arrangement allows a flow of coolant 40 to enter into the liquid to refrigerant heat exchanger 1 at the first end through the port 21, to travel through the liquid to refrigerant heat exchanger 1 by traversing the coolant volume 20, thereby exchanging heat with a flow of refrigerant also passing through the liquid to refrigerant heat exchanger 1, and to subsequently be removed from the liquid to refrigerant heat exchanger 1 through the outlet port 22 as either a chilled or heated flow of coolant. In some other embodiments, the coolant inlet port 21 and the coolant outlet port 22 may alternatively be arranged at the same end of the plastic housing 3.

In some especially preferable embodiments, the plastic housing 3 is an injection-molded component. Such a construction allows for the coolant ports 21, 22 to be integrally formed in the plastic housing 3, thereby minimizing the number of discrete parts required. Additional features such as, for example, stiffening ribs and a gasket well, can also be readily included in the plastic housing 3 with such a construction.

Figures 3, 4:
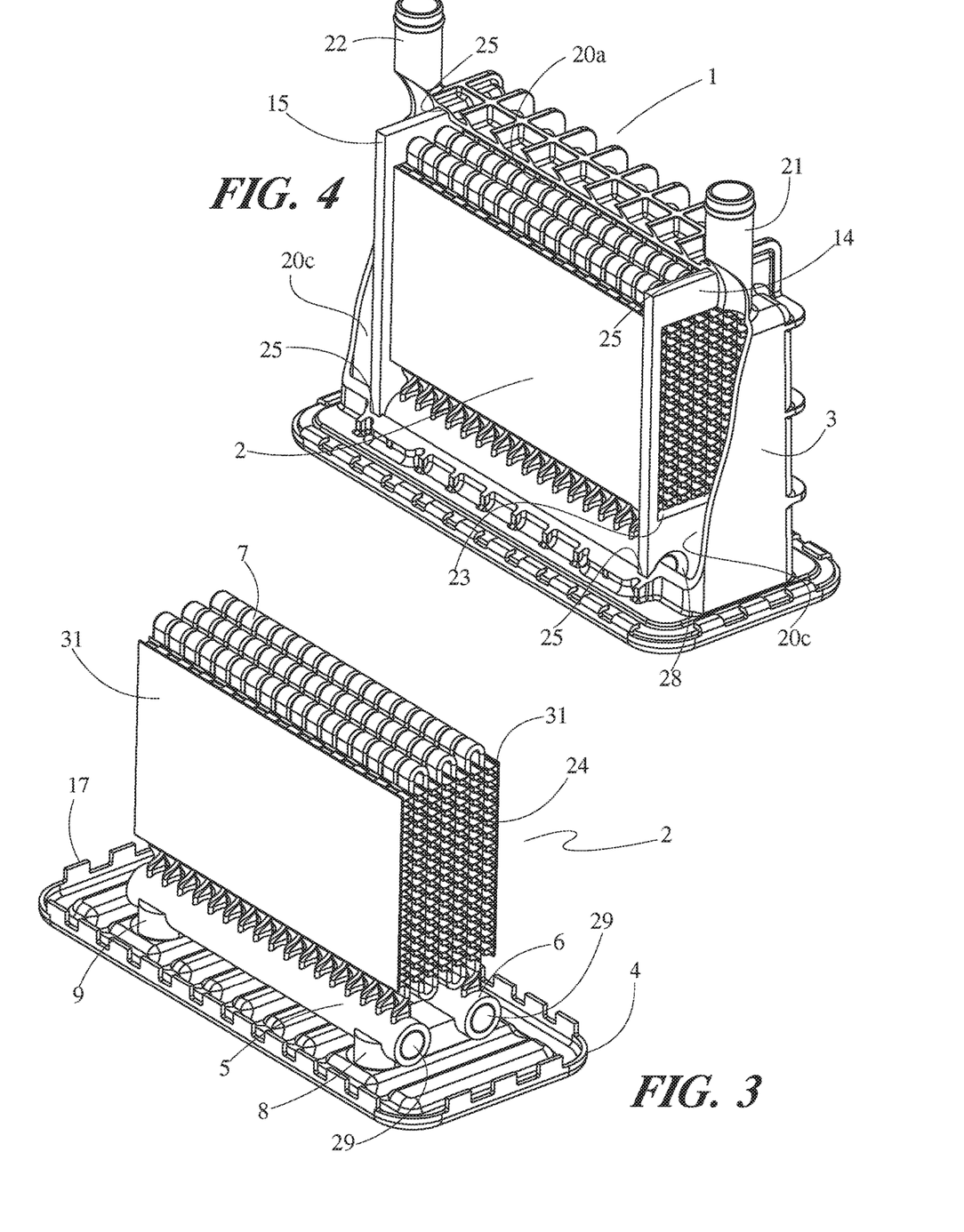
FIG. 3 is a perspective view of portions of the liquid to refrigerant heat exchanger of FIG. 1 prior to final assembly.
FIG. 4 is a partially cut-away perspective view of the liquid to refrigerant heat exchanger of FIG. 1.

The closure plate 4 can be produced as a stamped plate out of, for example, aluminum sheet material. Various features can be provided within the closure plate 4, such as an upturned peripheral flange 17 (as seen in FIG. 3) to be used as a crimp joint for the securing of the plastic housing 3. The closure plate 4 can also be provided with beads 26 formed into the plate to provide structural stiffening of the closure plate 4, as well as to locate and reinforce the gasket well of the plastic housing 3.

The brazed assembly 2 containing the closure plate 4 is depicted in FIG. 3, and is preferably an assembly of aluminum components that are joined together to form a monolithic construction in a single brazing operation. In the exemplary embodiment of FIG. 3, the brazed assembly 2 also includes a pair of cylindrical pipes 5 and 6 that function as manifolds for the refrigerant flow. In the exemplary embodiment, the cylindrical pipe 5 is an inlet manifold for a flow of refrigerant, while the cylindrical pipe 6 is an outlet manifold for the flow of refrigerant. The inlet manifold 5 and the outlet manifold 6 are hydraulically connected by multiple formed tubes 7 that function as refrigerant conduits to convey the refrigerant through the coolant volume 20 from the inlet manifold 5 to the outlet manifold 6.

The refrigerant conduits 7 are preferably flat aluminum tubes having one or more flow channels (not shown) extending therethrough. In particularly preferable embodiments, the refrigerant conduits 7 are aluminum micro-extrusions having a series of parallel-arranged flow channels. Such a construction is known to be particularly well-suited for use with high-pressure refrigerants, as it allows for increased pressure resistance through the use of small hydraulic diameters coupled with relatively thick walls to serve as pressure boundaries.

Figure 5:
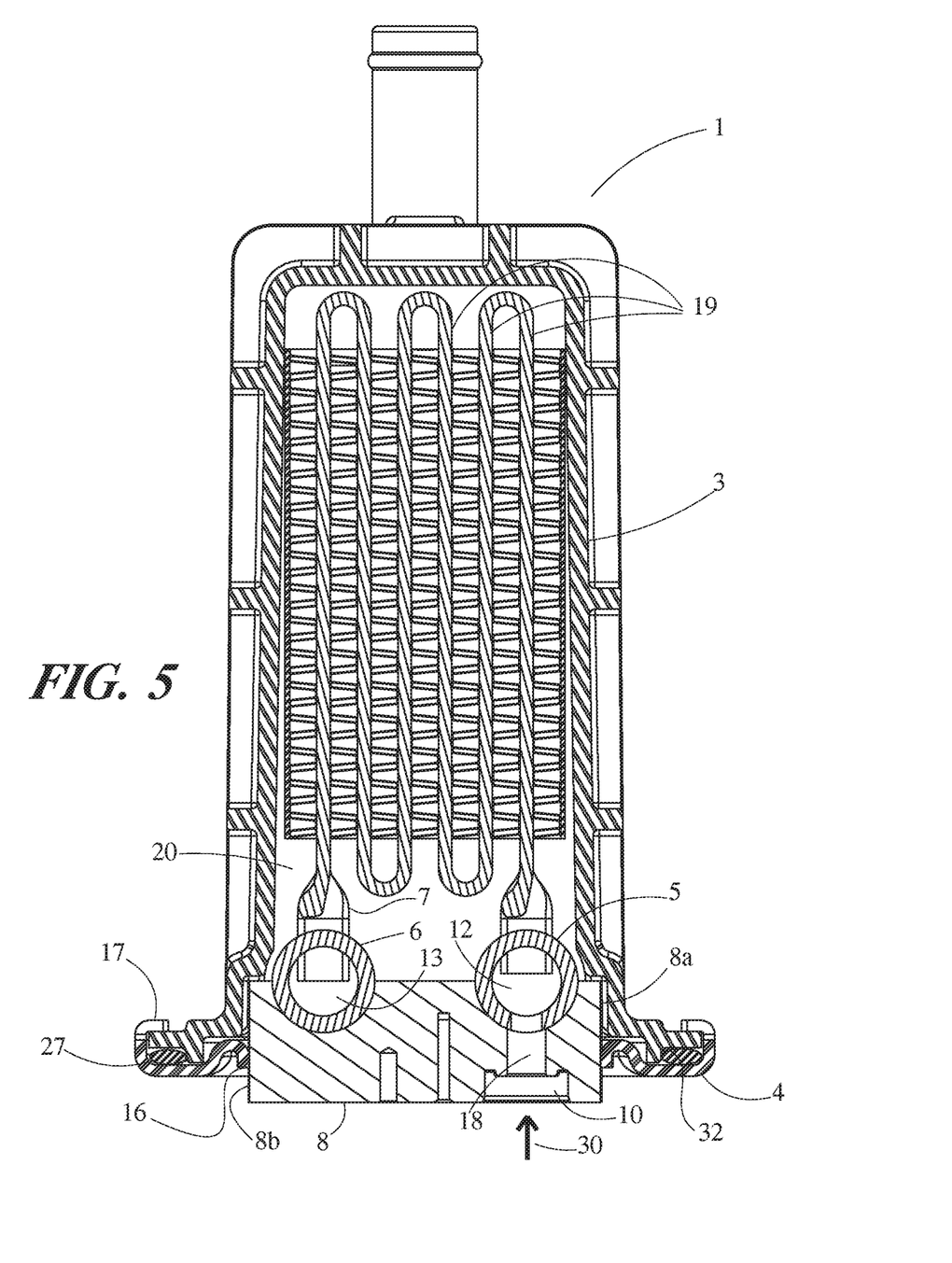
FIG. 5 is a side section view of the liquid to refrigerant heat exchanger of FIG. 1.

As best seen in the cross-sectional view of FIG. 5, each refrigerant conduit 7 has a series of U-bends formed to create multiple sequentially arranged passes 19 for the flow of refrigerant through the heat exchanger 1. The ends of each refrigerant conduit 7 are twisted by 90° about the tube-axial direction and are inserted into corresponding slots in the manifolds 5, 6. This allows for a close spacing of the refrigerant conduits 7 along the lengths of the manifolds, thereby maximizing the available outer surface are of the conduits 7 for purposes of heat transfer with the coolant.

Coolant fins 24 are arranged between the successive passes 19 of the conduits 7, and are brazed to the flat outer surfaces of the conduits 7 in order to provide both structural rigidity and surface area enhancement for the efficient transfer of heat to or from the coolant. The coolant fins 24 as depicted are of the lanced and offset type, although other types of fin surfaces can be contemplated. Aluminum side sheets 31 are optionally provided on either end of the stack of conduits 7 and fins 24 in order to both bound the coolant flow and to assist in securing the components prior to and during the brazing process.

The refrigerant inlet manifold 5 and the refrigerant outlet manifold 6 are joined to and supported by a pair of fitting blocks 8, 9. The fitting blocks 8, 9 are spaced apart from one another along the axial lengths of the manifolds 5, 6, and are provided with arcuate recesses to receive the manifolds 5, 6. Each of the fitting blocks extends partially through a flanged aperture 16 in the metal closure plate 4, so that a first portion (e.g. the portion 8a identified in FIG. 5 for the fitting block 8) of the fitting block is located within the coolant volume 20, and a second portion (e.g. the portion 8b identified in FIG. 5 for the fitting block 8) of the fitting block is located outside of the coolant volume 20.

The fitting block 8 is provided with a refrigerant inlet port 10 on the aforementioned second portion 8b, and is therefore referred to as an inlet fitting block. Refrigerant linework from the refrigerant system can be connected to the inlet fitting block 8 in order to deliver a flow of refrigerant 30 from the refrigerant system into the liquid to refrigerant heat exchanger 1 by way of the refrigerant inlet port 10. A refrigerant flow path 18 extends through the inlet fitting block 8 and provides fluid communication between the refrigerant inlet port 10 and an internal volume 12 of the refrigerant inlet manifold 5. The flow of refrigerant 30 can thereby be delivered to the refrigerant inlet manifold 5 and can be subsequently distributed to the flow channels within the refrigerant conduits 7.

In a similar manner, the fitting block 9 is provided with a refrigerant outlet port 11, and is therefore referred to as an outlet fitting block. The refrigerant outlet port 11 is in fluid communication with an internal volume 13 of the outlet manifold 6 in a similar manner to that described for the refrigerant inlet port 10, i.e. by way of a flow channel (not shown) extending through the outlet fitting block 9. After flowing through the refrigerant conduits 7, the refrigerant flow 30 is received into the internal volume 13 and is delivered to the refrigerant outlet port 11. Refrigerant linework from the refrigerant system can also be connected to the outlet fitting block 9 in order to return the flow of refrigerant from the liquid to refrigerant heat exchanger 1 back to the refrigerant system by way of the refrigerant outlet port 11.

The brazed assembly 2 of FIG. 3 can be created by assembling the various components (e.g. the manifolds 5 and 6, the conduits 7, the coolant fins 24, the optional side plates 31, the fitting blocks 5 and 6, and the closure plate 4) together with braze alloy appropriately placed on surfaces of the components that are to be joined. The braze alloy can be provided as a clad layer on one or more the components, or can be applied as a foil or a paste, or some combination of these. End caps 29 can additionally be inserted into the open ends of the manifolds 5 and 6 prior to brazing in order to seal off the manifolds. Once assembled, the assembly 2 can be fixtured and heated in a brazing oven in order to reflow the braze alloy and create the braze joints between the components.

In some especially preferable embodiments, the components that define the brazed assembly 2 are all constructed of a brazeable aluminum alloys. Such a construction advantageously provides a compact and low-weight design. However, in other embodiments the brazed assembly 2 can be constructed of other metals such as titanium, steel, copper, and the like.

Prior to assembly of the brazed assembly 2 and the plastic housing 3, coolant baffles 14 and/or 15 can be assembled to the brazed assembly 2 or to the plastic housing 3. The baffles 14, 15 can be constructed of a variety of materials, including plastic, elastomers, rigid foams, metal, etc. The plastic housing 3 is provided with recessed grooves 25 to receive the baffles and to retain their position once the liquid to refrigerant heat exchanger 1 is fully assembled. In some embodiments, the coolant baffles 14, 15 are provided with circular holes 28 that correspond to the ends of the manifolds 5, 6. The coolant baffles 14, 15 can be assembled to the brazed assembly 2 by insertion of the ends of the manifolds into the holes 28, thereby placing the coolant baffles 14, 15 in the appropriate position prior to the assembly of the plastic housing 3. In other embodiments, the coolant baffles 14, 15 can be inserted into the grooves 25 of the plastic housing 3 prior to the insertion of the brazed assembly 2.

The coolant baffles 14, 15 divide the coolant volume 20 into three portions. A heat exchange portion 20a of the coolant volume 20 is located between the first coolant baffle 14 and the second coolant baffle 15. The refrigerant conduits 7 and the coolant fins 24 are preferable located completely within the heat exchange portion 20a. The coolant baffle 14 separates the heat exchange portion 20a from a coolant inlet portion 20b arranged at the end of the heat exchanger 1 where the coolant inlet port 21 is located, so that the flow of coolant 40 received into the liquid to refrigerant heat exchanger 1 through the coolant inlet port 21 is discharged into the coolant inlet portion 20b. The coolant baffle 15 separates the heat exchange portion 20a from a coolant outlet portion 20c arranged at the end of the heat exchanger 1 where the coolant outlet port 22 is located, so that the flow of coolant 40 removed from the liquid to refrigerant heat exchanger 1 through the coolant outlet port 21 is received from the coolant outlet portion 20c.

The coolant baffles 14, 15 are each provided with an aperture 23 that corresponds to the outer periphery of the assembled coolant fins 24. The flow of coolant is directed and channeled into the coolant fins 24 from the inlet portion 20b of the coolant volume 20 through the aperture 23 of the coolant baffle 14. Similarly, the flow of coolant is discharged into the outlet portion 20c of the coolant volume 20 through the aperture 23 of the coolant baffle 15.

The liquid to refrigerant heat exchanger 1 is assembled by inserting the refrigerant conduits 7, coolant fins 24, and manifolds 5 and 6 of the brazed assembly 2 into the plastic housing 3. An elastomeric seal 27 is arranged within a gasket well 32 that extends along the periphery of the opening of the plastic housing 3 prior to the insertion of the brazed assembly 2. After the brazed assembly 2 is fully inserted, the peripheral flange 17 is crimped over onto the peripheral edge of the plastic housing 3 in order to compress the seal 27 so that leakage of coolant is prevented. Beads 26 can be formed into the closure plate 4 in order to back-stop the gasket well and prevent deformation of the plastic housing 3 during the crimping process.

Figure 6:
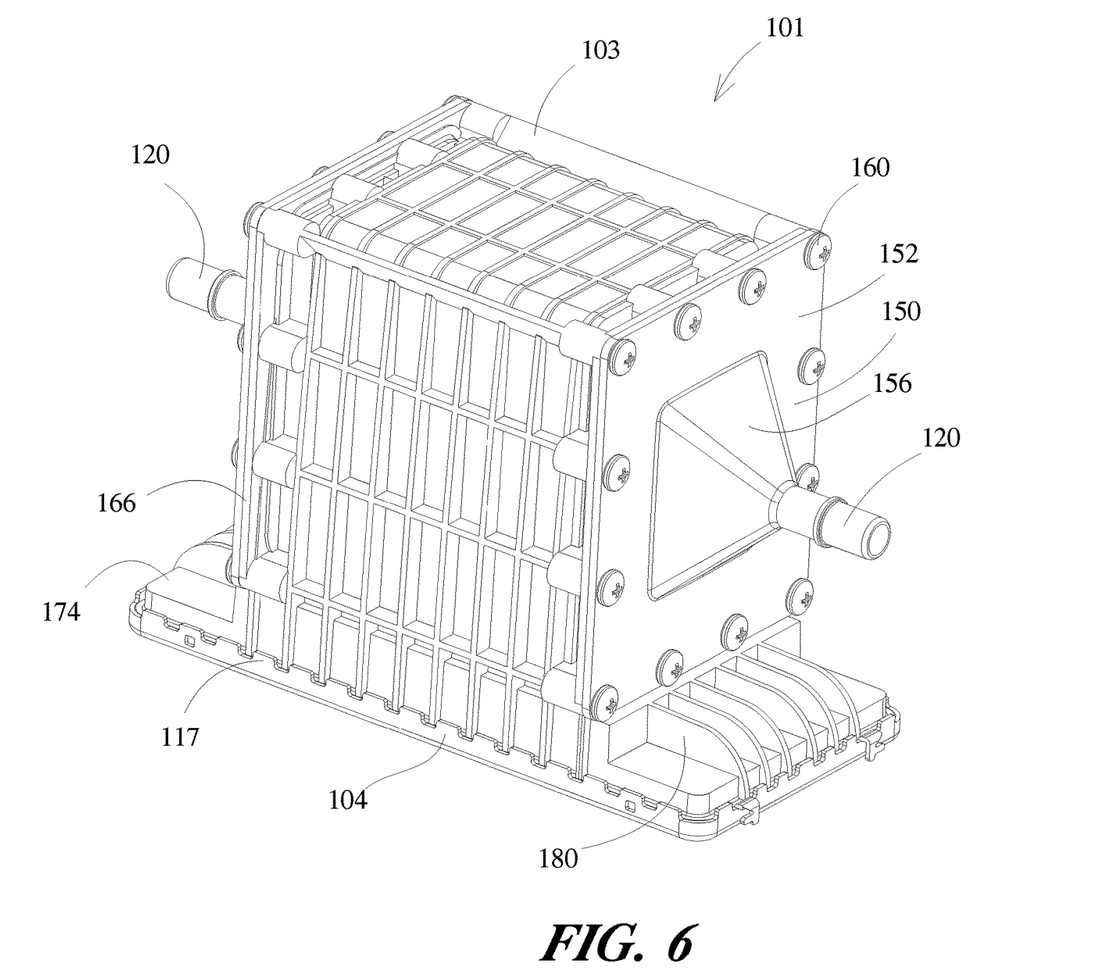
FIG. 6 is a perspective view of a liquid to refrigerant heat exchanger according to an embodiment of the invention.

FIGS. 6-15 depict another embodiment of the current invention. As shown in FIG. 6, the heat exchanger 101 is arranged to flow a coolant liquid (not shown) through the heat exchanger 101 such that coolant enters and leaves the heat exchanger 101 parallel to a same, longitudinal direction via an inlet port 120 arranged along a same longitudinal axis 105 as an outlet port 120 at an opposite end of the heat exchanger 101. The coolant also flows through a heat exchanger core 102 parallel to the longitudinal axis 105. The heat exchanger 101, however, is constructed to vary the coolant flow via coolant diffusers 150 located interior to the inlet and outlet ports 120. The current embodiment shows the inlet and outlet ports 120 being integral to the coolant diffusers 150. The diffuser 150 at the inlet port 120, or the inlet diffuser, expands the coolant flow, the coolant not flowing strictly parallel to the longitudinal axis 105, the diffuser 150 at the outlet port 120, or the outlet diffuser, contracts the coolant after the coolant flows through the core 102, again the coolant not flowing strictly parallel to the longitudinal axis 105. In this way, velocity of flow of the coolant can be reduced through the heat exchanger 101, allowing the coolant to be in the core 102 for a longer period of time and increase heat transfer between the coolant and refrigerant (also not shown) within the core 102.

Figure 14:
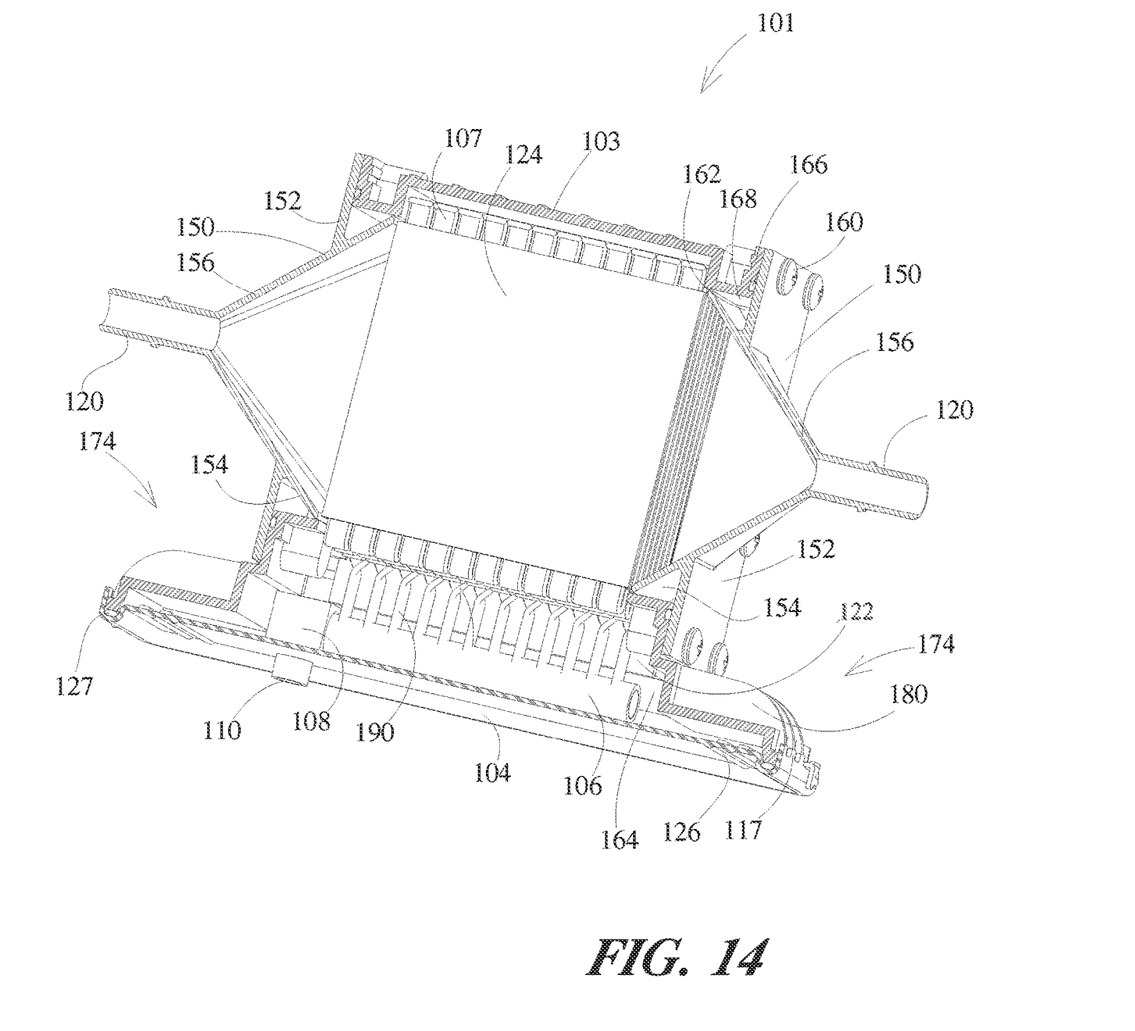
FIG. 14 is a perspective section view of the liquid to refrigerant heat exchanger of FIG. 6.
Figure 15:
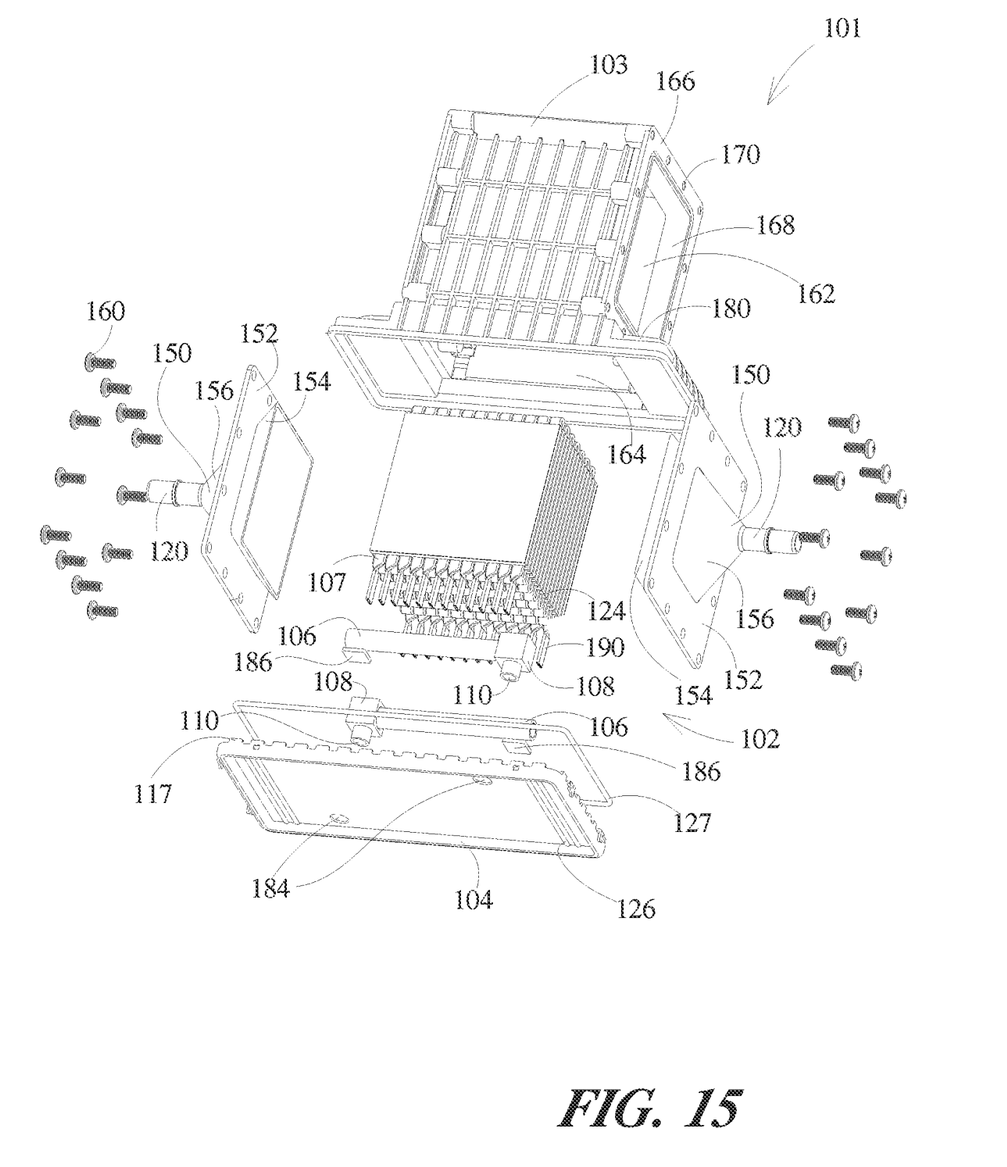
FIG. 15 is an exploded perspective view of the liquid to refrigerant heat exchanger of FIG. 6.

Also shown by FIG. 6 is a housing 103, which may be made from plastic, capped by the diffusers 150 at opposite longitudinal ends of the housing 103, and capped by a closure plate 104, which may be made from a metal, at another end of the housing perpendicular to the longitudinal ends having the diffusers 150. In this embodiment, the closure plate 104 has a flange 117, and the closure plate 104 is joined to the housing 103 by crimping the flange 117 to the housing 103. As shown in FIGS. 14-15, a seal 127 is disposed between the closure plate 104 and the housing 103. The assembly of the housing 103, closure plate 104, and the diffusers 150, therefore, defines a coolant volume 122 within this assembly that seals and contains a coolant. As further shown in this embodiment, the housing 103 includes extension areas 174 extending outwardly parallel to the longitudinal axis 105 and having support ribs 180. The diffusers 150 are mounted to the housing 103 in parallel to the longitudinal axis 105 via fasteners 160, which may be screws or bolts. The fasteners 160 secure the diffusers 150 by extending through a diffuser flange 152 of the diffusers 150 and into the side walls 166. The diffusers 150 are sealed to the side walls 166 by O-ring type seals disposed between the diffusers 150 and the sides walls 166. There may be an O-ring groove in either the diffusers 150 or the side walls to further support the seals.

Figure 7:
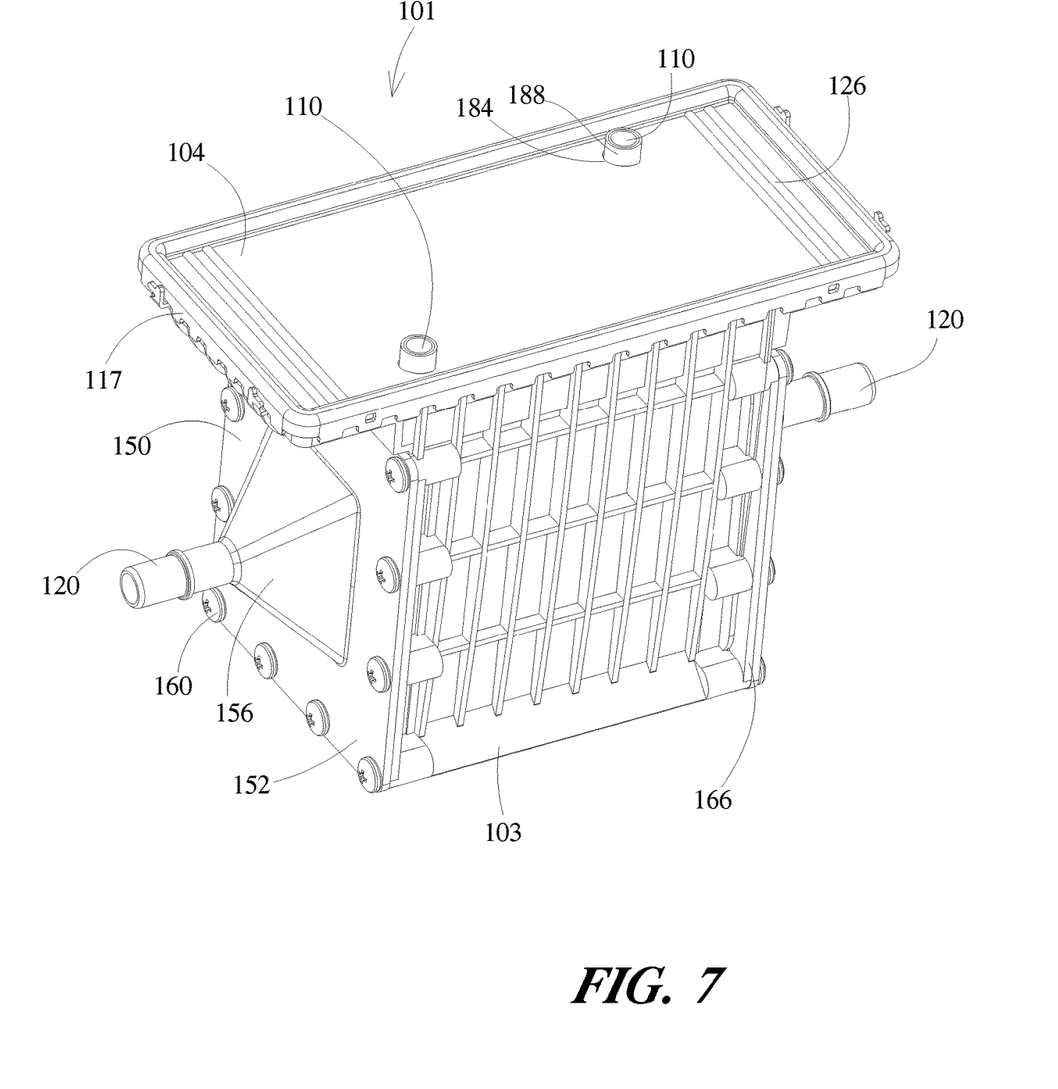
FIG. 7 is another perspective view of the liquid to refrigerant heat exchanger of FIG. 6.

FIG. 7 further depicts the heat exchanger 101, showing refrigerant ports 110 extending into the heat exchanger 101 via holes 184 of the closure plate 104. The refrigerant ports 110 provide a refrigerant inlet port and a refrigerant outlet port for the heat exchanger 101. Support beads 126 are shown extending across the closure plate 104 in a depth direction of the heat exchanger 101.

Figure 8:
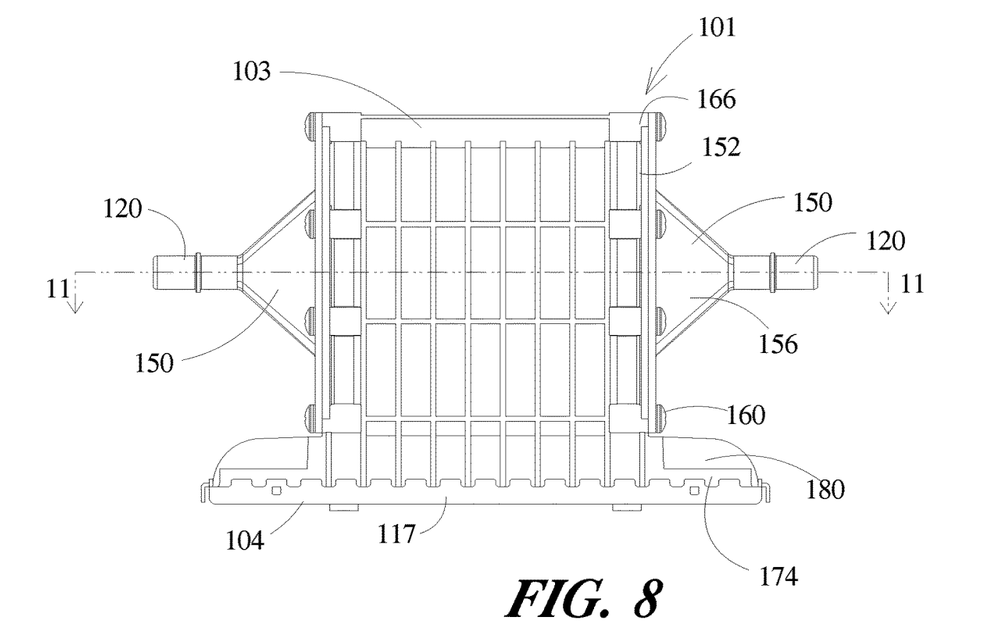
FIG. 8 is a side view of the liquid to refrigerant heat exchanger of FIG. 6.
Figure 9:
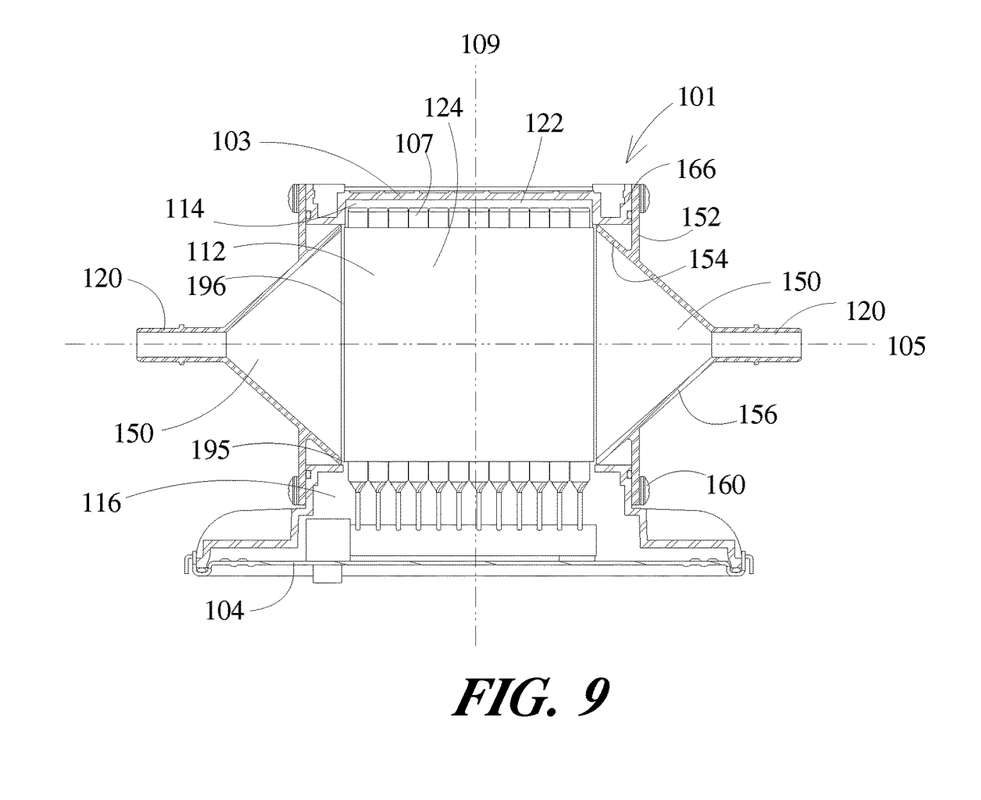
FIG. 9 is a side section view of the liquid to refrigerant heat exchanger taken along section line 9-9 of FIG. 10.
Figure 10:
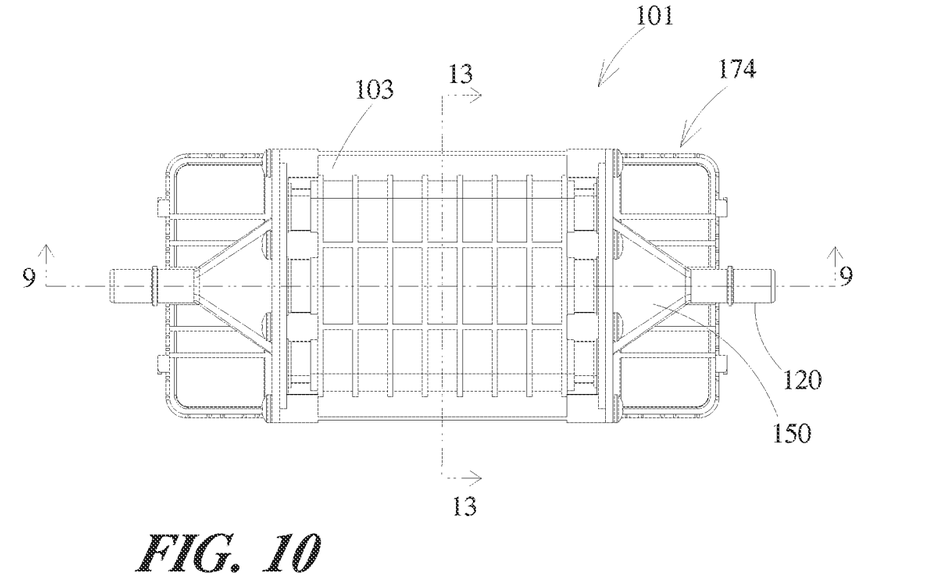
FIG. 10 is a top view of the liquid to refrigerant heat exchanger of FIG. 6.
Figure 11:
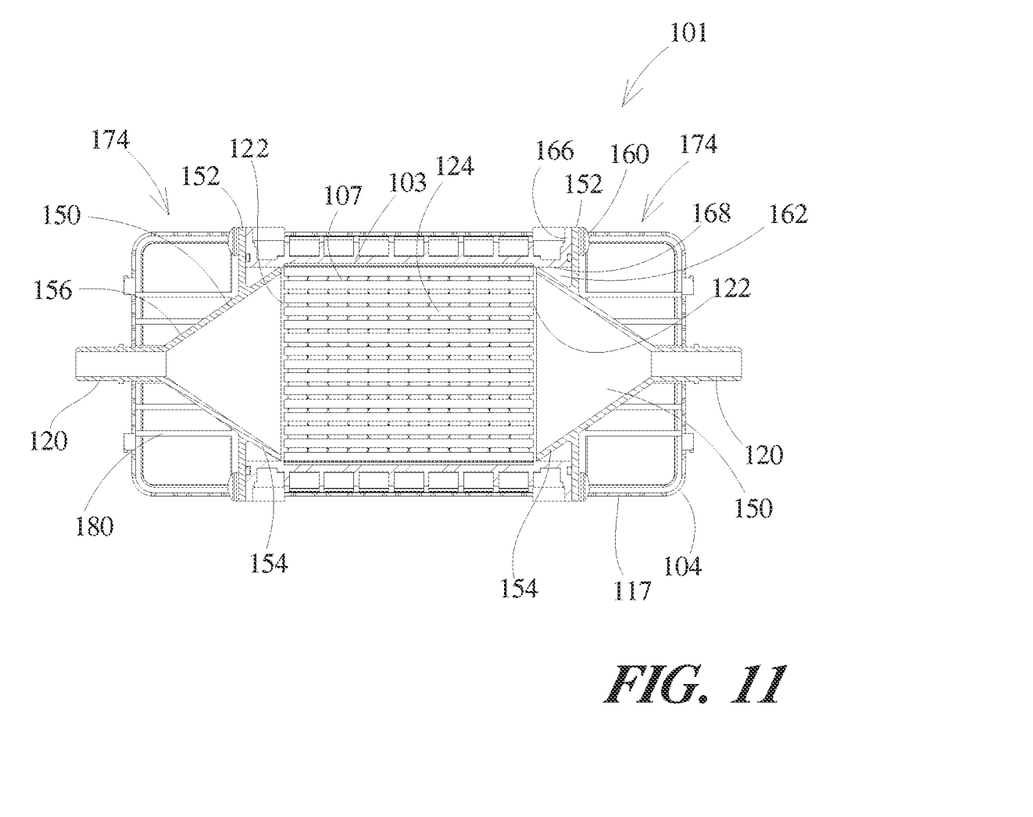
FIG. 11 is a top section view of the liquid to refrigerant heat exchanger taken along section line 11-11 of FIG. 8.
Figure 12:
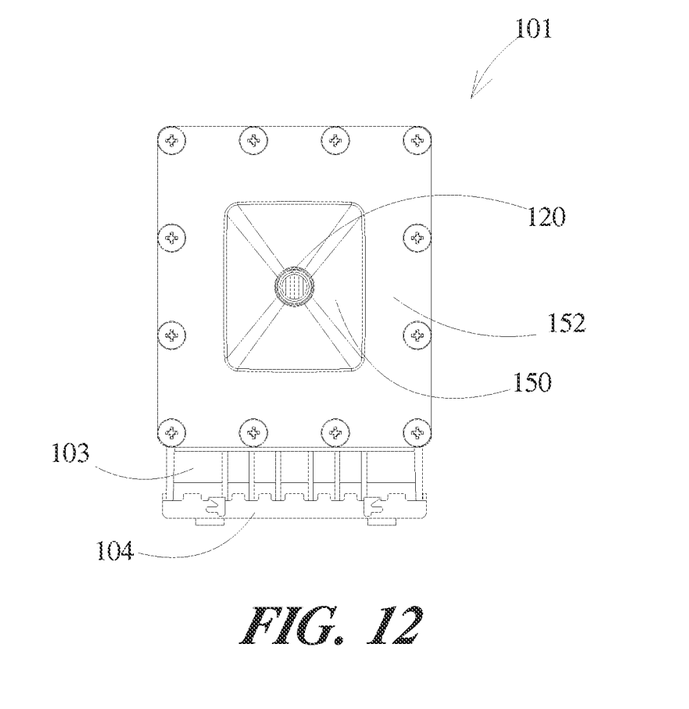
FIG. 12 is a side view of the liquid to refrigerant heat exchanger of FIG. 6.

FIGS. 8 and 9 depict the heat exchanger 101 along the longitudinal axis 105, especially showing tapered geometries of the diffusers 150, as a tapered wall of each of the diffusers 150 extends obliquely relative to the longitudinal axis 105 via a tapered outer portion 156, as the tapered outer portion 156 connects one of the ports 120 with the flange 152, and via a tapered inner portion 154, as the inner portion 154 approaches the core 102 from the flange 152. Therefore, the cross-section of the tapered inner portion 154 is greater than the cross-section of the tapered outer portion 156, as shown in FIGS. 9, 11, and 14. The shape of the diffusers 150 allows the coolant liquid to spread out as it leaves the inlet port 120, which slows the velocity of the coolant liquid within the heat exchanger 101. Further, the velocity of the coolant liquid is also impeded as it leaves the core 102, where the flow area for the coolant liquid is reduced in the outlet diffuser 150.

Figure 13:
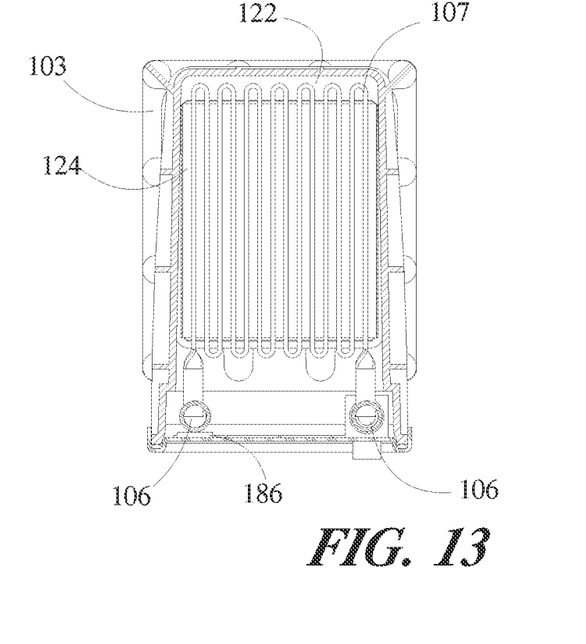
FIG. 13 is a side section view of the liquid to refrigerant heat exchanger taken along section line 13-13 of FIG. 10.

A refrigerant volume of the heat exchanger is depicted in FIGS. 9, 11, 13-15 through a plurality of tubes 107 that extend into the coolant volume 122 of the heat exchanger 101. The plurality of tubes 107 are connected to manifolds 106, an inlet end of the each of the plurality of tubes 107 being joined to an inlet manifold 106, and an outlet end of each of the plurality of tubes 107 being joined to an outlet manifold 106. The manifolds 106 are connected to the refrigerant ports 110 via refrigerant fittings 108. Each of the plurality of tubes 107 includes a plurality of sequentially arranged passes, as best depicted in FIG. 13. Each of the plurality of tubes 107 further included twisted portions 190, one of which extends from one of the passes to the inlet manifold 106 and one of which extends to the outlet manifold 106. The twist of the twisted portions allows the tubes to be rotated by 90 degrees at the joints with the manifolds, allowing more tubes to joined the manifolds in a given space versus the tubes not being twisted.

The plurality of tubes 107 defines part of the core 102, and further defining the core 102 are a plurality of fins 124, at least one of the plurality of fins is located between and joined to adjacent ones of the plurality of sequentially arranged passes of the plurality of tubes 107. In the embodiment shown in FIGS. 6-15, two fins 124 bound the core 102 on two sides, as best shown in FIGS. 11 and 13. The fins 124 provides extended surfaces for the plurality of tubes 107 through which the coolant flows to enhance heat transfer between the coolant and the refrigerant within the plurality of tubes 107. Parts of the core 102 are joined together through brazing, as an assembly of the tubes 107, fins 124, manifolds 106, and the fittings 108, and the core 102 is brazed to the closure plate 104. In this embodiment, spacers 186 between each manifold 106 and the closure plate 104 are included in the brazed assembly to provide support between the connection of the manifolds 106 to the closure plate 104.

The core 102 is further defined by the arrangement of the core 102 within the heat exchanger 101. As shown in the FIGS. 9, 11, and 13-15, the housing 103 has three openings—two side openings 162 and a core insertion opening 164. The side openings 162 provide locations for the coolant to flow into and out of the heat exchanger 101. The core insertion opening provides a location for the core 102 to be inserted into the heat exchanger 101. As discussed above, the diffusers 150 and the closure plate 104 seal these openings. The core insertion opening 164 provides access for the core 102 to a core cavity within the coolant volume 122 of the housing, as best depicted in FIGS. 9 and 14. The core cavity is where the core 102 is located within the housing 103 and is defined between the side openings 162 in along the longitudinal axis 105 and is defined between the closure plate 104 and a top wall of the housing opposite of the closure plate 104. As best shown in FIG. 9, the core cavity is defined by three sections a central section 112 that extends between the side openings 162, a top section 114 offset from the central section and above the side openings 162, and a bottom section 116 offset from the central section and below the side openings 162. The flow of coolant is focused in the central section 112 and limited in the top and the bottom sections due to the arrangement of the core 102 within the housing 103 as will being explained further.

As shown in FIG. 9, the plurality of fins are located in the central section 112 in-line along the longitudinal axis 105 with the side openings 162. Each of the fins 124 has channels (not shown) also aligned parallel to the longitudinal axis 105 and with the side openings 162 to allow the coolant to flow through the core 102 and between the tube passes. The side opening 162 each have a height along a core insertion axis 109 and a depth along the longitudinal axis 105 and as shown by a side opening rim 168 in FIG. 15. As shown in FIG. 9, fins 124 have a fin height that is less than the heights of the side openings 162, and the tubes 107 have a tube height measured from the connection of the tubes 107 to the manifold 106 to a top of the passes, where the tubes 107 bend into one of the sequential passes. The tubes 107 are therefore located in all three sections of the core cavity, the tube bends being in the top section 114, the twisted portions 190 of the tubes and the manifolds 106 being in the bottom section 116, and the most of the sequential passes being in the central section 112. The fins 124, however, are only located in the central section 112 of the core cavity, where most of the coolant flows. The core 102 is inserted into the core cavity of the housing such that there is only a small gap 195 between the fins 124 and the side openings to mitigate the flow of coolant around the fins 124.

The configuration between the core 102 and the diffusers 150 also allows the flow of coolant to be focused at the central section 112 and the fins 124. The inner portions 154 diffusers 150 have each have a diffuser height such that the inner portions 154 fit tightly within the side openings 162. The diffuser height, therefore, as measured along the core insertion axis 109 at the most inward end of the inner portion 154 is equal to or nearly equal to the side opening height, leaving space only if needed to insert the diffuser 150 into the housing 103 at the side opening 162. As shown in in FIG. 9, the diffuser 150 is inserted into the side opening 162, such that there is only a small distance between the inner most end of the side opening 162 and the inner most end of the diffuser 150. In this configuration, a gap 196 between the inner portion 154 of the diffuser and the fins 124 is greater than the gap 195 between the inner most end of the side opening 162 and the fins 124. Alternatively, the inner most end of the side opening 162 and the inner most end of the diffuser may aligned along the longitudinal axis 105. Also, the tapered walls of the diffusers 150 are aligned with at least a portion of the fins 124 to direct coolant into the fins 124 and not around the fins 124.

Moreover, geometries of the diffusers 150 allows the coolant to disperse to the entire fin height while flowing to and from the coolant ports 120 within a compact design of a heat exchanger 101 as depicted in FIGS. 6-15. The current design allows the entire brazed core 102 and manifold 106 assembly to be contained within the coolant volume 122 and the housing 103. The accomplish this the housing 103 is long enough along the longitudinal axis 105 to contain the manifolds 106 that extend beyond the dimensions of the plurality of tubes 107 and the plurality of fins 124 as measured along the longitudinal axis 105. To reduce the overall length of the heat exchanger 101, the diffusers 105 are partially disposed with the housing 103, that is, the inner portions 154 of the diffusers 150 are located within the side openings 162. The outer portion 156 of the diffuser 150 has a length along the longitudinal axis 105 that is at least as long as the length of the inner portion 154 as measured along the longitudinal axis 105. In the current embodiment, the sum of the lengths along the longitudinal axis 105 of the inner portion 154 and the outer portion 156 of each of the diffusers 150 less than the diffuser height as measured at the inner most end of the inner portion 154 of the diffuser 150. This diffuser height can be double this sum providing for wide dispersal of the coolant over a relative short distance.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes, the inlet manifold defining a first diameter;
an outlet manifold connected to an outlet end of each of the plurality of tubes, the outlet manifold defining a second diameter;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, wherein at least a portion of the inlet manifold is located within the coolant volume, wherein at least a portion of the outlet manifold is located within the coolant volume; and wherein at least a portion of the inlet manifold and at least a portion of the outlet manifold are located outside of the coolant volume,
wherein both the portion of the inlet manifold located inside the coolant volume and the portion of the inlet manifold located outside the coolant volume have the first diameter, and
wherein both the portion of outlet manifold located inside the coolant volume and the portion of the outlet manifold located outside the coolant volume have the second diameter.

2. The liquid to refrigerant heat exchanger of claim 1, wherein the inlet manifold includes an inlet fitting block having a refrigerant inlet port, wherein the outlet manifold includes an outlet fitting block having a refrigerant outlet port, and wherein both the inlet fitting block and the outlet fitting block extend through the closure plate, and wherein the inlet manifold and the outlet manifold are both joined to the closure plate respectively by the inlet fitting block and the outlet fitting block and by at least one spacer that is located between each of the inlet manifold and the outlet manifold and the closure plate.

3. The liquid to refrigerant heat exchanger of claim 2, wherein the core, the closure plate, the inlet manifold, the outlet manifold, the inlet fitting block, the outlet fitting block, and the at least one spacer are joined together by braze joints to define a refrigerant flow path.

4. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate,
wherein the core cavity extends from the first side opening to the second side opening and extends from the core opening to a first housing wall opposite the core opening, wherein both of the first side opening and the second side opening are offset from the core opening and the first housing wall along a core insertion axis to define a first offset area and a second offset area outside of a central area between the first side opening and the second side opening, wherein at least one of the plurality of tubes extends along the core insertion axis through the first offset area and the central area and into the second offset area, wherein the inlet manifold and the outlet manifold are located at least partially within the first offset area, wherein at least one of the plurality of fins extends within the central area from a first location along the first side opening and at a first tube of the plurality of tubes to a second location along the second side opening and at a second tube of the plurality of tubes, and wherein the at least one of the plurality of tubes extends beyond the at least one of the plurality of fins at the first offset area and at the second offset area.

5. The liquid to refrigerant heat exchanger of claim 4, wherein the central area is further defined as having a central area height equal to a first side opening height along the core insertion axis, and wherein a first gap is located between the at least one of the plurality of fins and the first side opening and wherein a second gap is located between the at least one of the plurality of fins and the second side opening.

6. The liquid to refrigerant heat exchanger of claim 4, wherein a third gap is located between the at least one of the plurality of fins and the first diffuser, wherein a fourth gap is located between the at least one of the plurality of fins and the second diffuser, wherein the third gap is larger than the first gap, and wherein the fourth gap is larger than the second gap.

7. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, and wherein the housing is sealingly joined to the closure plate by a peripheral crimp joint, and wherein at least a portion of the inlet manifold is located within the coolant volume, wherein at least a portion of the outlet manifold is located within the coolant volume; and wherein at least a portion of the inlet manifold and at least a portion of the outlet manifold are located outside of the coolant volume, and wherein both portions of the inlet manifold located inside and outside the coolant volume have a first diameter, and wherein both portions of the outlet manifold located inside and outside the coolant volume have a second diameter.

8. The liquid to refrigerant heat exchanger of claim 1 wherein each of the plurality of tubes includes a plurality of sequentially arranged passes through the coolant volume, and wherein at least one of the plurality of fins is located between and joined to adjacent ones of the plurality of sequentially arranged passes.

9. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, wherein each of the plurality of fins has a fin height along a core insertion axis that is less than or equal to an opening height along the core insertion axis of each of the first side opening and the second side opening, and wherein each of the plurality of tubes has a tube height along the core insertion axis that is greater than the opening height along the core insertion axis of each of the first side opening and the second side opening.

10. The liquid to refrigerant heat exchanger of claim 1, wherein the first diffuser comprises a first tapered wall that extends from a coolant inlet port to a first diffuser opening, and wherein the second diffuser comprises a second tapered wall that extends from a coolant outlet port to a second diffuser opening.

11. The liquid to refrigerant heat exchanger of claim 10, wherein the first diffuser opening is located within the first side opening, wherein the coolant inlet port is located outside of the first side opening, wherein the second diffuser opening is located within the second side opening, and wherein the outlet port is located outside of the second side opening.

12. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, wherein the first diffuser comprises a first tapered wall that extends from a coolant inlet port to a first diffuser opening, wherein the second diffuser comprises a second tapered wall that extends from a coolant outlet port to a second diffuser opening, wherein the first diffuser includes a first flange that extends at least partially around the first tapered wall, wherein the first tapered wall extends onto both sides of the first flange such that the first tapered wall extends on one side of the first flange and extends on another side of the first flange opposite of the one side, and wherein the first flange is sealed and fastened to the housing.

13. The liquid to refrigerant heat exchanger of claim 12, wherein the coolant inlet port is located on the one side of the first flange and the first side opening is located on the another side of the first flange.

14. The liquid to refrigerant heat exchanger of claim 4, wherein the first diffuser and the second diffuser are both disposed within the coolant volume, and wherein the first diffuser and the second diffuser are both disposed outside of the core cavity.

15. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, and wherein the housing is sealingly joined to the closure plate by way of an elastomeric seal and a crimp joint extending along the outer periphery of the closure plate, and wherein at least a portion of the inlet manifold is located within the coolant volume, wherein at least a portion of the outlet manifold is located within the coolant volume; and wherein at least a portion of the inlet manifold and at least a portion of the outlet manifold are located outside of the coolant volume, and wherein both portions of the inlet manifold located inside and outside the coolant volume have a first diameter, and wherein both portions of the outlet manifold located inside and outside the coolant volume have a second diameter.

16. The liquid to refrigerant heat exchanger of claim 15, wherein the elastomeric seal is arranged within a gasket well provided by the closure plate.

17. A liquid to refrigerant heat exchanger comprising:
a housing comprising a core opening, a first side opening, a second side opening, and a core cavity;

a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, and wherein the closure plate includes a plurality of support ribs extending across an interior angle of an external surface of the housing, each of the plurality of support ribs having an arcuate corner portion.

18. A liquid to refrigerant heat exchanger comprising:
a housing comprising a core opening, a first side opening, a second side opening, and a core cavity;
a core disposed within the housing, the core comprising, a plurality of tubes and a plurality of fins;
an inlet manifold connected to an inlet end of each of the plurality of tubes;
an outlet manifold connected to an outlet end of each of the plurality of tubes;
a closure plate joined to the inlet manifold and the outlet manifold;
a first diffuser extending at least partially through the first side opening; and
a second diffuser extending at least partially through the second side opening;
wherein the housing and the closure plate define a coolant volume of the heat exchanger,
wherein the closure plate seals the coolant volume at the core opening and along an outer periphery of the closure plate, wherein the first side opening is defined by a first depth along a width axis of the housing perpendicular to a core insertion axis, wherein the second side opening is defined by a second depth along the width axis, and wherein a first cross-section of the first diffuser at a first end of the first side opening is less than a second cross-section of the first diffuser at a location within the first depth of the first side opening.

19. The liquid to refrigerant heat exchanger of claim 1, wherein the first diffuser includes an inlet port, a first diffuser opening, and, a first tapered wall expanding in cross-section from the inlet port located outside of the coolant volume to the first diffuser opening located inside of the coolant volume, wherein the second diffuser includes an outlet port, a second diffuser opening, and a second tapered wall expanding in cross-section from the outlet port located outside of the coolant volume to the second diffuser opening located inside of the coolant volume, and wherein the first diffuser opening is at least as large as a height along a core insertion axis of at least one of the plurality of fins.

\* \* \* \* \*